Oct. 5, 1965 A. G. BILLIN ETAL 3,209,457
DUAL CONTROLLER FOR DENTAL DRILLS
Filed May 23, 1960 2 Sheets-Sheet 1
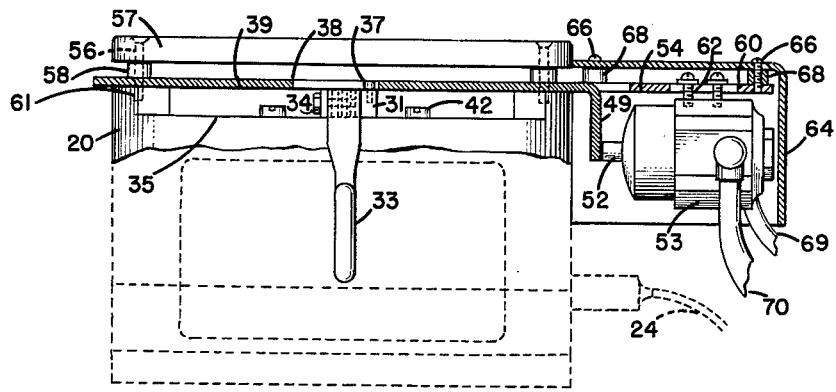
Fig. 1
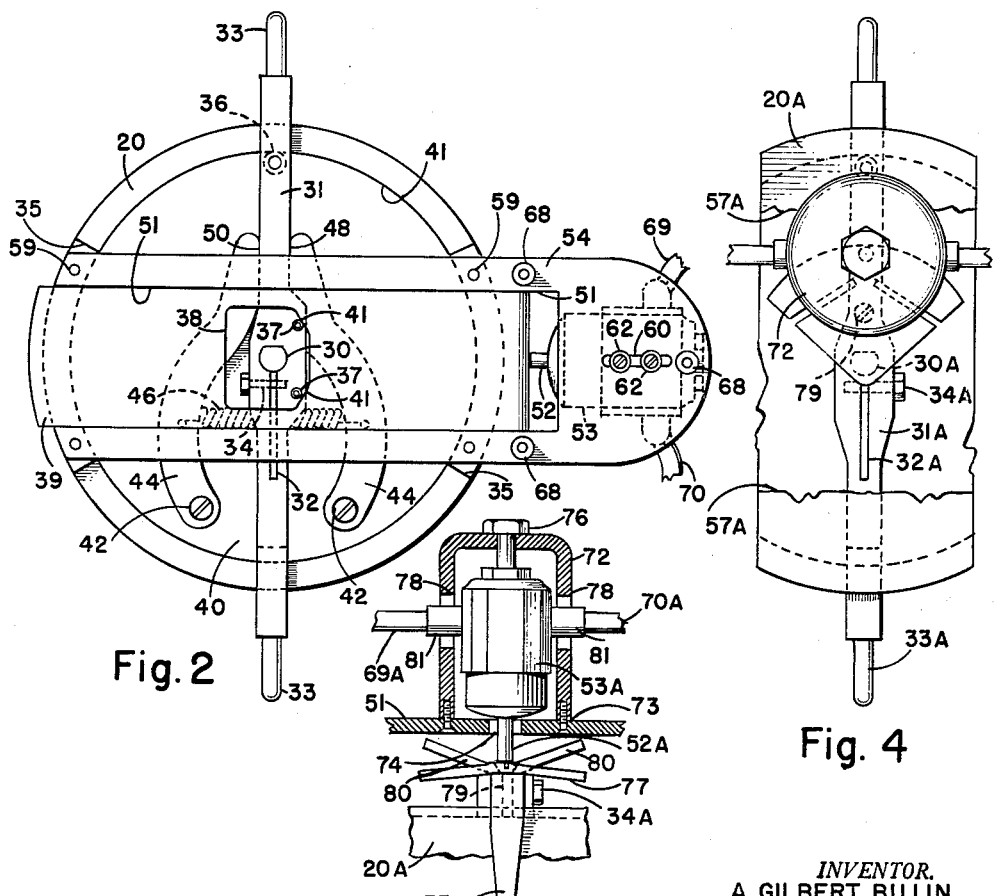
Fig. 2
Fig. 3
Fig. 4
*INVENTOR.*
A. GILBERT BILLIN
TYLER C. STEWART
BY
ATTORNEYS

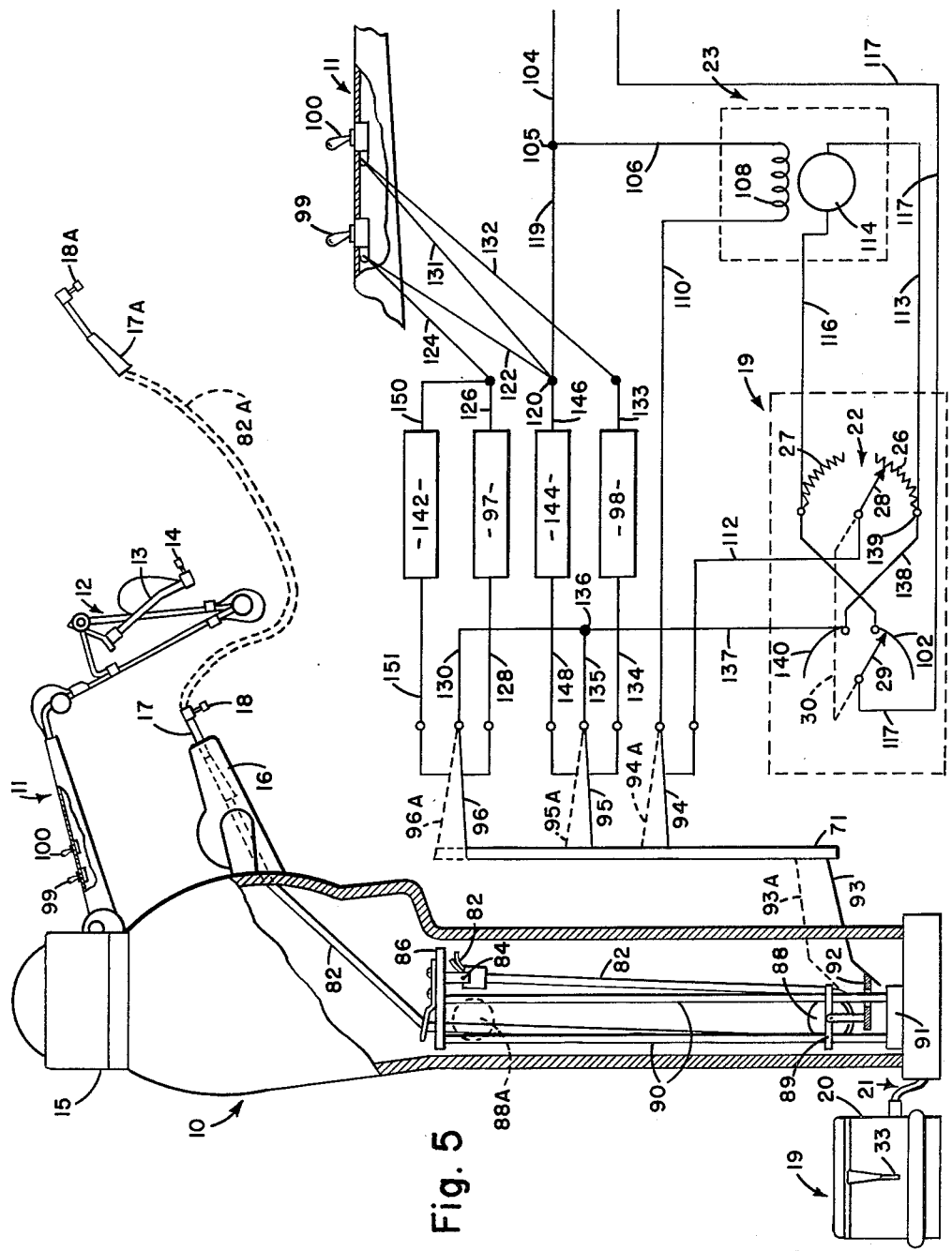

United States Patent Office 3,209,457
Patented Oct. 5, 1965

1

3,209,457
DUAL CONTROLLER FOR DENTAL DRILLS
Arthur Gilbert Billin, Rochester, and Tyler C. Stewart, Syracuse, N.Y., assignors to Ritter Company, Inc., Rochester, N.Y., a corporation of Delaware
Filed May 23, 1960, Ser. No. 31,030
10 Claims. (Cl. 32—22)

This invention relates to dental drills and more particularly to controls for dental drills.

Dental drills or burrs have for a great many years, until the recent era of fluid turbine driven drills, been driven by means of a dental engine. The dental engine driven type dental drill, being operative at relatively low rates of speed, up to 32,000 revolutions per minute, is still utilized by dentists for a number of operations. Speeds as low as 4,000 revolutions per minute are required for finishing operations and other dental work. However, the bulk of the drilling performed by dentists today is handled by means of the more recently developed fluid driven high speed turbine type dental drills which attain speeds in exces of 150,000 revolutions per minute.

Since the development of the high speed dental drills, many dentists have employed two separate units, one for the low speed dental engine driven drill and one for the high speed fluid turbine driven drill. This has presented for dentists a very awkward arrangement, particularly where alternate use of the high and low speed drills during the performance of a single operation is necessary. However, more recently there have been dental units produced and sold in which the high and low speed dental drills are mounted on the same dental unit with separate controls for each of the drills. This arrangement, also due to the lack of a common control for both dental drills, has resulted in a lot of lost motion for dentists when changing from one type drill to the other type drill.

One of the objects of our invention is to provide a dual control for the high and low speed dental drills or dental burrs which are both mounted on the same dental unit whereby both of the above described types of dental drills may be controlled selectively by a single controller.

A further object of our invention is to provide a dual control including automatic switch means whereby one of the above described dental drills will normally be controlled by a dual controller and the other drill will only be controlled by the dual controller when the handpiece in which it is mounted is withdrawn from a dental unit on which the handpieces of both drills are mounted.

Another object of our invention is to provide a dual control whereby either of the above described types of dental drills may be rendered operatively effective upon actuation of a single controller including an electric circuit for selecting which of the dental drills will be actuated by the single controller.

Our invention further contemplates the selective control of air and water or just air being released from sources of air and water under pressure for use with either the dental engine driven drill or the high speed fluid driven dental drill.

An additional object of our invention is to provide an improved and simplified apparatus for controlling a low speed dental engine driven drill and high speed fluid turbine driven dental drill.

A further object of our invention is to provide a dual control unit of the nature above described conveniently located for the dentist or operator thereof.

A further object of our invention is to provide a dual control unit of the nature described above, which is simple and positive and efficient in operation and relatively cheap to manufacture and maintain.

Other objects and advantages of our invention will be particularly set forth in the claims and will be apparent from the following description of two embodiments of our invention when taken in connection with the accompanying drawings.

In the drawings:

FIG. 1 is a fragmentary side elevational view partly in section of one embodiment of our dual controller;

FIG. 2 is a top planar view with the top cover removed of the same embodiment of our invention shown in FIG. 1;

FIG. 3 is a fragmentary side elevational view partly in section of a second embodiment of our invention;

FIG. 4 is a fragmentary top planar view with parts broken away of the same embodiment of our invention shown in FIG. 3; and FIG. 5 is a side view of a dental unit partly in section showing the dental arm 11, its appendages, the dental engine handpiece and drill, the fluid driven high speed handpiece and drill, the view also including a side view of a dual controller and a diagrammatic showing of the electric circuitry for selectively controlling the dental engine driven drill with or without air or water being supplied to the dental engine handpiece or controlling the fluid driven high speed dental drill with or without water being supplied to the fluid driven high speed handpiece.

Referring to FIG. 5, a dental unit 10 pivotally supports a dental arm 11, appendages 12 and dental engine handpiece 13 and drill or burr 14. A dental engine (not shown) is mounted in the head 15 of the dental unit 10 (see Lauterbach Patent No. 2,810,196 issued October 9, 1956). The dental unit 10 also retractably supports an instrument support panel (see Bronk Patent No. 24,087 issued November 19, 1955) in which a fluid driven high speed handpiece 17 and drill or burr 18 are supported when not in use. In the position 17A and 18A, the handpiece and drill, respectively, are shown at a withdrawn position ready for use by the dentist. The broken lines 82A extending from the handpiece 17A through the instrument support panel 16 represent the air and water connections for the high speed drill 18 in a withdrawn position. The dental engine driven drill or low speed drill 14 and the fluid driven drill or high speed drill 18 are selectively controlled by a dual controller generally indicated by the numeral 19 having connections generally indicated by the numeral 21 which extend to the dental unit 10 as shown in FIG. 5. It is understood that these connections 21 are, of necessity, considerably longer than illustrated.

Referring to FIG. 1 and FIG. 2, the first embodiment of our dual controller 19 is generally supported by a casing 20 within the lower interior region of which is located an electrical control system (not shown) for a dental engine including a rheostat 22 shown diagrammatically in FIG. 5. This rheostat is effective to control the speed of the dental engine shown diagrammatically at 23 in FIG. 5 which in turn controls the low speed dental burr 14 (FIG. 5). The electric current flowing through the rheostat in a manner to be described hereinafter is carried to the rheostat from a source of alternating current through a conduit 24 shown in broken lines in FIG. 1.

Referring to FIG. 5, the rheostat 22, just mentioned, includes two resistances 26 and 27, one of which is in circuit with the electric circuitry controlling the dental engine 23, depending upon the direction in which a foot pedal 33 is rotated from a neutral position shown in FIG. 2. The rheostat 22 has a contact arm 28 and a wiper arm 29 effective to complete the electrical circuit controlling the dental engine 23. The rheostat 22 is rigidly mounted in the bottom of casing 20.

Referring to FIG. 2, a pivotal shaft 30 is rigidly mounted to the contact arm 28 and wiper arm 29 (see FIG. 5) in a vertical upwardly extending position perpendicular to arms 28 and 29. Pivotal shaft 30 is located substantially at the center of casing 20 and in the center of rheostat 22. The upper end of shaft 30, opposite the connection with contact arm 28, is keyed and locked in a complementary hole cut vertically through the center of a foot control lever 31. A longitudinal slot 32 cut vertically through foot control lever 31 and a bolt 34 threaded into foot control lever 31 in the manner shown in FIG. 2, are provided as a means to increase the friction and locking force between shaft 30 and the margins of the hole in which it is keyed to foot control lever 31. Foot control lever 31 is provided with a roller 36 depending therefrom in a manner to engage the interior surface 41 of casing 20. As foot control lever 31 pivots about shaft 30, roller 36 follows the contour of surface 41. Thus, roller 36 provides an alignment means for insuring a smooth concentric movement of the lever 31 when force is applied to one side of either of two depending foot pedal portions 33 of foot control lever 31. Two recessed portions 35 cut in casing 20 limit the arc of rotation of lever 31. Two small rollers 37 rotatably mounted to and upwardly extending from foot control lever 31, may be seen in both FIGS. 1 and 2. Rollers 37 are designed to engage the margins of an opening 38 of a slide 39 in the manner shown in FIGS. 1 and 2. The margins of the opening 38 form substantially a rectangle with two diagonal corners 41. Corners 41 and the margin of opening 38 extending between these corners constitute cam surfaces over which rollers 37 travel when lever 31 is actuated. When lever 31 is pivoted, one of the rollers 37 will cam the slide 39 to the right as viewed in FIG. 2.

A support floor 40 is rigidly mounted interiorly of casing 20 substantially flush with recesses 35 and above the rheostat 22 (not shown). Two tension levers 44 are pivotally mounted on two bolts 42 threaded into support floor 40 as shown in FIG. 2. It will be understood that lever 31 is designed to pass freely over bolts 42. A tension spring 46 is attached at its ends to tension levers 44. Tension levers 44 engage both vertical surfaces of lever 31 at 48 and 50 in order to impart tension on the foot control lever 31 in opposition to a force applied to either of the two foot pedals 33.

As shown in FIG. 2, the lever 31 is in its neutral position, and movement in a clockwise or counterclockwise direction with respect to FIG. 2, as the result of force being applied to either of the foot pedals 33, will actuate either the dental engine or the fluid driven turbine, depending upon which of these two is operatively controlled by this dual control at the time pressure is applied to pedals 33. The electrical circuitry by which the dual controller 19 selectively controls the engine or the turbine is explained hereinafter with reference to FIG. 5. The speed of rotation of the engine or turbine is proportional to the arc of rotation of the lever 31 from this neutral position.

Slide 39 is supported by casing 20 and is cammed to the right thereon, as viewed in FIG. 2, when the lever 31 is pivoted in either direction from its neutral position shown in FIG. 2. The camming of the slide 39 is accomplished by rollers 37 passing over the camming margins of opening 38.

A spring loaded control plunger 52 of a fluid pressure regulator 53 is always in an engaging position with a depending portion 49 of side 39 and opposes the right hand movement of slide 39 as viewed in FIG. 2. Therefore, it will be understood that slide 39 is moved to the left as viewed in FIG. 2, as a result of the back or spring pressure exerted by the plunger 52 when the lever 31 is released. Lever 31 is returned to its neutral position by tension lever 44 which is under pressure of spring 46.

As slide 39 is moved to the right or left, as described above, it is guided in a rectangular longitudinally extending slot or track 51 cut in a pressure regulator support 54 which is rigidly mounted on casing 20. Support 54 is secured to casing 20 by means of four bolts 56 (see FIG. 1). These bolts extend through a top cover plate 57, four spacers 58 interposed between support 54 and cover plate 57, four holes 59 cut through support 54 (see FIG. 2), and are threaded into four holes 61 bored in casing 20. Spacers 58 permit slide 39 to be freely cammed by rollers 37. Support 54 has a small elongated slot 60 adapted for receiving two lock screws 62 threaded into pressure regulator 53; thus, the pressure regulator 53 may be adjusted to the right or left, as viewed in FIG. 1, relative to the neutral position of the slide 39 as viewed in FIGS. 1 and 2. As shown in FIG. 1, the pressure regulator 53 is in an unlocked position with respect to support 54. When the pressure regulator has been positioned in the described location with respect to depending portion 49 of slide 39, the screws 62 are threaded into pressure regulator 53 locking the regulator to the support 54. The "normal" position in which the regulator will be locked will be as viewed in FIGS. 1 and 2 where the plunger 52 engages slide 39 in its neutral position without any pressure being exerted on the plunger 52; any camming of the slide from its neutral position will move the plunger 52 inward with respect to the regulator 53 causing a valve (not shown) therein to open.

In order to protect the pressure regulator 53 and insure that the adjustment just described, is not accidentally changed by jarring the regulator, a protection cover 64, designed for enclosing this portion of this embodiment of our invention, is rigidly mounted to the support 54 by three screws 66, extending through spacers 68 and threaded into three holes provided in the support 54.

The pressure regulator 53 has a fluid intake conduit 69 through which air is conducted to the regulator when electrical solenoid means described hereinafter permit the passage of air to conduit 69. Also, an outlet fluid conduit 70 is provided to supply air under pressure from the regulator to a turbine (not shown) located in the handpiece 17 which controls the high speed drill 18. The flow of air from conduit 69 through pressure regulator 53 to outlet fluid conduit 70 is controlled by the above mentioned valve (not shown) inside regulator 53. This valve is controlled by the plunger 52 which in turn is controlled by the slide 39. Hence, a movement of the foot control lever 31 causes variations in air pressure supplied to the turbine (not shown) of the handpiece 17. The degree of valve opening and, hence, the amount of air pressure supplied varies proportionately to the movement of the slide 39.

Normally, foot control lever 31 and shaft 30 connected to rheostat 22 are rendered operatively effective by means of the electrical circuitry described hereinafter with reference in FIG. 5, to control the speed of a dental engine and in turn the low speed dental drill 14. The foot control lever 31 and the slide 39 are rendered effective to control the air pressure supplied to the turbine (not shown) of the handpiece 17 only when the high speed drill 18 and handpiece 17 are withdrawn from the panel 16 to substantially the positions 18A and 17A (see FIG. 5). When the handpiece 17 is withdrawn, an engine-turbine switch 71 (FIG. 5) breaks the normally energized circuit including the rheostat 22 from the source of alternating current and completes another electrical circuit causing air to flow through inlet fluid conduits 69. When air flows through inlet conduit 69, the foot controller 31 is effective to supply a controlled amount of air under pressure to the turbine (not shown) as described above.

Thus, it is apparent that we have provided a single mechanism whereby a fluid driven high speed dental drill 18 or an engine driven low speed dental drill 14 may be controlled by a dual controller 19. Furthermore, it is significant of our invention that, regardless of which direction the foot control lever 31 is pivoted from its neutral position, as viewed in FIG. 2, the effective control of the pressure regulator is the same. The function of the lever just described is accomplished by the provision of the two rollers 37 effective to cam the slide 39 to the right as viewed in FIG. 2, regardless of the direction in which lever 31 is pivoted. However, the direction in which the lever 31 is pivoted from the neutral position determines whether the low speed drill 14 will be driven clockwise or counterclockwise. This reversal of the dental engine 23 and in turn the drill 14 will be described more in detail hereinafter with reference to FIG. 5. The variation in speed of the dental engine 23 varies proportionately to the arcuate distance by lever 31 when the lever is actuated.

Now referring to FIGS. 3 and 4, we have here shown a second embodiment of our invention by which both a high speed and low speed dental drill may be selectively controlled by a dual controller. Most of the parts and functions as described with regard to our first embodiment shown in FIGS. 1 and 2 are identical to those shown in FIGS. 3 and 4 and we have designated corresponding parts with the same identical numerals as their counterparts in FIGS. 1 and 2 with the suffix "A" added thereafter. The parts and function thereof controlling the dental engine 23 of our second embodiment are identical to those shown in FIGS. 1 and 2 and described with reference thereto. Therefore, we will not describe those parts nor their function as applied in FIGS. 3 and 4. The distinguishable features of the second embodiment shown in FIGS. 3 and 4, as contrasted to those described in FIGS. 1 and 2, are the parts by which the pressure regulator 53A is controlled.

The pressure regulator 53A is mounted vertically above cover plate 57A at a radially spaced distance from the center of cover plate 57A (see FIG. 4) and in the same vertical plane as the foot control lever 31A when located in its neutral position. Regulator 53A is structurally supported by a housing 72 rigidly mounted on top cover plate 57A by a plurality of screws 73 threaded through holes bored in cover plate 57A and into holes bored in housing 72. A hole 74 is provided in cover plate 57A at the center of where housing 72 is mounted. A plunger 52A of a pressure regulator 53A extends downwardly through hole 74. Pressure regulator 53A is supported by an adjustment nut 76 engaging housing 72. The pressure regulator 53A may be adjusted upwardly or downwardly by rotating nut 76 in order to properly locate the plunger 52A with respect to a cam 77. Thus, the same "normal" position described with regard to plunger 52 and portion 49 of slide 39 may be attained where the plunger 52A engages cam 77 in its neutral position without any pressure being exerted on the plunger 52A. Housing 72 is provided with two vertical elongated holes 78 through which inlet fluid conduit 69A and outlet fluid conduit 70A extend. The holes 78 are of sufficient length vertically to permit proper up and down adjustment of the regulator 53A.

The apparatus for controlling the plunger 52A in this second embodiment of our invention, which corresponds to the slide 39 in our first embodiment, is the cam 77. Cam 77 is rigidly mounted on a lever 31A by a screw 79 threaded through cam 77 into a hole bored vertically through foot control lever 31A. Cam 77 has two wings or camming surfaces 80, each of which extends upwardly from the neutral position to the cam as viewed in FIG. 3. It will be understood that surfaces 80 extend upwardly on both sides of the neutral position in order to cam the plunger 52A inwardly in response to the movement of lever 31A regardless of the direction of movement away from its neutral position. The function is identical to that performed by the combination of slide 39 and rollers 37 in our first embodiment. As the plunger 52A is elevated with respect to FIG. 3, a valve (not shown) in pressure regulator 53A, is opened and air under pressure flows to the turbine (not shown) of the high speed dental drill 18 controlled thereby. Thus, it will be seen that the second embodiment of our invention, although structurally different, provides exactly the same function as the first embodiment of our invention.

Referring to FIG. 5, we have shown the preferred electrical circuitry constituting a part of our invention and operatively effective with either of the two embodiments of our invention shown in FIGS. 1–4 and described above. The controlling factor in this circuitry is the engine-turbine switch 71 by which the dual controller 19 is selectively rendered effective to control either the dental engine 23 or the pressure regulator 53 which in turn controls the turbine for the high speed drill 18.

For purposes of illustration, it is understood that we have shown the electrical circuitry in FIG. 5 in a greatly enlardged diagrammatic view as compared to the size of the illustrated dental unit 10. The switch 71 is mounted inside the dental unit 10. When the switch 71 is in the position shown in solid line, it is in its "normal" position and the electrical circuitry of our invention renders the dual controller 19 effective to control the dental engine 23 and in turn the low speed drill 14. The switch 71 is maintained in its "normal" position at all times that the high speed drill 18 and accompanying handpiece 17 is supported in the instrument support panel 16.

In the preferred embodiment of our invention, air and water connections 82, extending respectively from the controller 19 and a source of water to the handpiece 17, are pivotally mounted at 84 to a support member 86 rigidly mounted within the dental unit 10. Connections 82 pass under a retriever pulley 88. The retriever pulley 88 is rotatably mounted on a collar guide 89 which is slidably mounted on two vertically extending members 90 rigidly mounted between a base portion 91 of the dental unit 10 and the support member 86. The collar 89 maintains the air and water connection 82 in an engaging position with the retriever pulley 88 to prevent the connections 82 from slipping off of pulley 88 as the pulley is raised and lowered. A counterbalance weight 92 is rigidly mounted to the collar guide 89 at the center of retriever pulley 88 so that the retriever pulley 88 is free to rotate with respect to both collar guide 89 and weight 92.

When the dentist has completed the use of the drill 18, he merely pulls on the connections 82 which creates sufficient tension on the tension releasable catch (not shown) to unlock the pulley 88. It will be understood that the counterbalance weight 92 returns the retriever pulley 88 and the air and water connection 82 to the downward or "normal" position shown in solid line in FIG. 5 and the high speed dental drill 18 and the accompanying handpiece 17 are returned to the withdrawn position in the instrument support panel 16.

The counterbalance weight 92 is designed to engage an extension or trip arm 93 at the position 93A of switch 71 during the descent of the pulley 88 and thereby force the trip arm 93 and switch 71 to its lowermost position shown in solid lines. The weight 93 maintains the switch 71 in this position at all times except when the high speed dental drill 18 and handpiece are withdrawn from the panel 16.

When the switch 71 is in the lowermost position shown in solid lines in FIG. 5, the dual control 19 is rendered effective to control the dental engine 23 and in turn, the low speed dental drill 14. When the high speed dental drill 18 and handpiece 17 are withdrawn from panel 16 and the counterbalancing weight 92 is raised, the trip arm 93 is returned to the position shown in broken line at 93A by a spring mechanism (not shown). At this position, the engine-turbine switch 71 switches the electrical circuitry and renders the dual controller 19 effective to control the high speed dental drill 18.

The switch 71 has three contact arms 94, 95 and 96. When these arms are in the "normal" position shown in solid lines in FIG. 5, they are in a circuit including the foot controller 19, the dental engine 23 and two solenoid valves 97 and 98. The solenoid valve 97 is connected to a water line (not shown) which supplies water to the dental engine handpiece 13 and valve 97 controls the flow of water therethrough. The solenoid valve 98 is connected to an air line (not shown) which supplies air under pressure to the dental handpiece 13 and the valve controls the passage of air therethrough. This circuit includes two switches 99 and 100 mounted on the dental arm 11 for selectively controlling solenoid valves 97 and 98. The switches 99 and 100 provide a convenient means for the dentist to selectively provide air, water, or air and water, to the dental engine handpiece 13. The object and advantages of supplying air, water, or air and water, to the dental engine handpiece 13 is the subject of the E. R. Ziegler et al. Patent No. 2,924,880. The switches 99 and 100 are shown in the "on" position. Both air and water are supplied to the handpiece 13 when switches 99 and 100 are in the "on" position; when the switch 100 is tripped to the "off" position, only water is being supplied to the dental engine handpiece 13, and in turn, if switch 99 is in the "off" position and switch 100 is in the "on" position, only air is being suppled to the handpiece 13. With both switches 99 and 100 in the "off" position, neither air nor water are supplied to handpiece 13.

The above described circuit is not completed until the lever 31 of the controller 19 is actuated away from the neutral position shown in FIG. 2. When lever 31 is actuated in a clockwise direction as viewed in FIG. 2, the shaft 30 (see FIG. 5) and the contact arm 28 and wiper arm 29 are likewise pivoted clockwise. The contact arm 28 makes contact with the resistance 26 and wiper arm 29 engages the wipe contact 102 and the circuit is thereby completed. With the shaft 30 and arms 28 and 29 rotated clockwise from a neutral position, current flows from an alternating source through a lead 104 to 105 where the current flows in parallel circuitry through a circuit described and through a line 106, a field winding 108 of the dental engine 23, a line 110, contact arm 94, a lead 112, contact arm 28, resistor 26, a line 113, an armature 114 of the dental engine 23, a line 116, a wipe contact 102, wiper arm 29, and a lead 117 to the source of alternating current. Thus, the dental engine 23 is actuated, and as the lever 31, shaft 30 and contact arm 28 are rotated further away from the neutral position in a clockwise direction, the speed of the dental engine 23 is thereby increased. The current flowing through lead 104 divides at 105 and flows in parallel circuitry through a line 119, and assuming both switches 99 and 100 to be in "on" position, the current further divides at 120 and flows in parallel through line 122, switch 99, line 124, line 126, solenoid valve 97, line 128, contact arm 96, and line 130 to 136. The current divided in parallel at 120 also flows through line 131, switch 100, line 132, line 133, solenoid valve 98, line 134, contact arm 95, line 135, and joins at 136 with the current flowing through line 130. The current then flows through line 137, line 138 and at 139 joins the current flowing through resistor 26 in line 113, thereby completing the parallel circuit including the dental engine 23 and two solenoid valves 97 and 98. It will be understood that by reversing the direction of rotation of the lever 31, shaft 30, arm 28 and arm 29, to a counterclockwise direction from the neutral position the contact arm engages resistance 27 and wiper arm 29 engages a wipe contact 140 and the direction of rotation of the low speed drill 14 is thereby reversed.

When the retriever pulley 88 is lifted in opposition to weight 92 by a withdrawal of the air and water connections 82 from the dental unit 10 by the dentist, the trip arm 93 is thereby released from the pressure exerted by the counterbalance weight 92 and moves to the position of 93A. The contact arms of switch 71 are respectively raised to the positions 94A, 95A and 96A, thereby coming into contact with a second circuit which is completed by actuation of the lever 31 and shaft 30 in either direction from the neutral position. This second circuit includes the foot controller 19, the armature 114 of the dental engine 23 and two solenoid valves 142 and 144. The solenoid valve 142 is in a water line (not shown but included in the connections 82) supplying water to the high speed dental handpiece 17 from which the water is sprayed onto the operative area of the tooth for cooling thereof. The solenoid valve 144 is in an air line (not shown but included in the connections 82) supplying air to the pressure regulator 53 mounted on the dual controller 19. The switch 100 is not effective to control the solenoid valve 144 which is always in circuit when the contact arm 95 is in the position 95A and the lever 31 of the dual control 19 is not in its neutral position. However, the switch 99 is effective to control the solenoid valve 142. Therefore, regardless of whether the dual controller 19 is rendered effective to control the high speed drill 18 or the low speed drill 14 by means of the position of the retriever plate 88, the switch 99 is effective to turn on and off water flowing to whichever of the dental handpieces is being used by the dentist.

When the second circuit is completed by actuating the lever 31 of the controller 19 away from its neutral position, current flows from a source of alternating current through lead 104 and line 119 to 120 where the current divides and flows in parallel circuits. The current in one of the parallel circuits flows from 120 through line 146, air solenoid valve 144, line 148, contact arm 95A, line 135 to 136, and in the other circuit, from 120 through line 122, switch 99, line 124, line 150, water solenoid valve 142, line 151, contact arm 96A, line 130 to 136 where the current travelling parallel circuitry joins. From 136, the current flows through line 137, line 138, line 113, armature 114 of the dental engine 23, line 116, wipe contact 102, wiper arm 129, line 117 to the source of alternating current. If the lever 31 of the dual control 19 is pivoted in a counterclockwise direction from a neutral position, the wiper arm 29 makes contact with wipe contact 140 and the current flowing through line 137 will now flow through wipe contact 140, wiper arm 29 and line 117 to the source of alternating current.

Regardless of which of the two circuits described above is actuated, the voltage drop across the resistances in circuit is not sufficient to prevent the required current from flowing to the solenoid valves 97, 98, 142 and 144 to render them effectively controlled by their respective circuits. It is understood that a number of electrical circuits in varying arrangements could accomplish the same end result which the above described circuits accomplish. Such variations in electrical circuit do not depart from the spirit and concept of our invention.

When the dentist has completed his use of the high speed dental drill 18, he gives the connections a tug and the retriever pulley 88 is effective to return the connections 82 and the counterbalance weight 92 to the lowest position as shown in solid lines at FIG. 5. Weight 92 engages trip arm 93 and returns the engine-turbine switch 71 to its normal position in which it makes contact with the electrical circuit rendering the dual controller 19 effective to control the low speed dental drill 14.

In operation, when the dentist decides to use either the fluid driven turbine high speed drill 18 or the dental engine driven low speed drill 14, he merely withdraws the dental handpiece of his choice from its inoperative position to an extended operative position and the retriever pulley switching arrangement automatically renders the drill of his choice operatively controlled by the dual controller 19.

Assuming that the dentist has selected the low speed drill 14 for use, he merely engages the pedal 33 with his foot and moves it in either direction from the neutral position shown in FIG. 2, depending upon whether he is desirous of a clockwise or counterclockwise rotation of the drill 14, and with increased arcuate displacement of the lever 31, there will be a corresponding increase in the rate of speed of the drill 14. If the dentist desires a fine spray of water to be discharged at the operative area, he throws the switches 99 and 100 to the "on" position, or if he desires that only air be discharged at the operative area, to aerate the part of the tooth being drilled, he throws the switch 99 to the "off" position and leaves the switch 100 on the "on" position. Likewise, if he is desirous of merely discharging a stream of water at the operative area, he trips the switch 99 to the "on" position and the switch 100 is tripped to the "off" position. It is understood that the dual controller 19 is not effective to control the pressure of the air and water controlled by the switches 99 and 100.

Assuming that the dentist selects the high speed drill 18 for use and has withdrawn it from the support panel 16, he merely engages the foot pedal 33 with his foot and in turn, the lever 31 is effective to control the plunger 52 of the pressure regulator 53 controlling the air pressure to the air driven turbine (not shown) mounted in the handpiece 117 for driving drill 18. Thus, increased arcuate displacement of the lever 31 in either direction from the neutral position shown in FIG. 2, results in a corresponding increase in the rate of speed of the high speed drill 18. If the dentist desires that water be discharged at the operative area through the handpiece 17, the switch 99 is moved to an "on" position. During use of the high speed drill 18, switch 100 is ineffective.

It will be understood that with only slight modification of the parts described, our invention is adaptable for use with a water driven high speed dental drill or with a vacuum driven high speed dental drill.

While we have shown and described the preferred embodiments of our invention, it will be apparent that various changes and modifications may be made therein, particularly in the form and relation of parts, without departing from the spirit of the invention as set forth in the appended claims.

We claim:

1. In combination, a dental unit, a first dental handpiece, and a second dental handpiece operatively connected to and mounted on said dental unit, a dental engine being effective to control the operation of said first dental handpiece, a turbine mounted in said second handpiece, a first electrical circuit including a rheostat being adapted to control said dental engine; a pressure regulator for controlling the pressure of air delivered to said turbine; a second electrical circuit being adapted to control the passage of air under pressure to said pressure regulator; a lever having a neutral position adapted to control said rheostat or said pressure regulator when not in neutral position; automatic switch means whereby one of said electrical circuits is normally energized, said switch means being effective to energize the electrical circuit which will render said lever effective to control the dental handpiece which is withdrawn from said dental unit.

2. Apparatus in accordance with claim 1 in which said automatic switch means comprises a switch mounted in said dental unit and a retriever pulley slidably mounted in said dental unit for returning said second dental handpiece to said dental unit, said pulley being adapted to control said switch.

3. A dual control for controlling a dental engine and a fluid driven dental turbine comprising, in combination, a casing; electrical means controlling said dental engine mounted to said casing; pressure regulator means controlling the speed of said turbine mounted to said casing; means movably supported by said casing, including a lever having a neutral position adapted for controlling said electrical means and said pressure regulator means when said lever is moved away from said neutral position; and selective means for selectively rendering said movable means effective to control said electrical means or said pressure regulator means.

4. A dual control for controlling a dental engine and a fluid driven dental turbine comprising in combination, a casing; electrical means controlling said dental engine mounted to said casing; pressure regulator means controlling the air pressure flowing to said turbine mounted to said casing; a lever having a neutral position adapted for controlling said electrical means and said pressure regulator means when said lever is moved away from said neutral position; a shaft interconnecting said electrical means and said lever, said lever and shaft being pivotally mounted with respect to said casing; a slide plate slidably mounted with respect to said casing and being slidably controlled by said lever when pivoted away from said neutral position, said plate being adapted to engage and control said pressure regulator when said lever is moved from its neutral position, and selective means for selectively rendering said lever effective to control said electrical means or said pressure regulator means.

5. A dual control for controlling a dental engine and fluid driven dental turbine comprising, in combination, a casing; electrical means controlling said dental engine mounted to said casing; pressure regulator means controlling the speed of said turbine mounted to said casing; means movably supported by said casing, including a lever having a neutral position adapted for controlling said electrical means or said pressure regulator means when said lever is moved away from said neutral position, and including a slide plate slidably mounted with respect to and cam controlled by said lever when actuated away from its neutral position; said pressure regulator being controllable by said slide plate when said lever is actuated away from its neutral position.

6. A dual control for controlling a dental engine and a fluid driven dental turbine comprising, in combination, an electrical control means to regulate the speed of said dental engine, a pressure regulator means regulating the flow of fluid under pressure from a source to said turbine, and means common to both said electrical control and pressure regulator means for selectively controlling one of said electrical control and pressure regulator means.

7. Apparatus in accordance with claim 6 in which said selective control means includes valve means controlling the flow of fluid under pressure to said turbine and selector means between said valve and said dental engine electrical control means for selectively opening said valve means or rendering said dental engine electrical control means effective to regulate the speed of said dental engine.

8. A dual control for controlling a dental engine and a fluid driven dental turbine comprising, in combination: an electrical control means; a pressure regulator means; a movable member and a control means for selectively rendering said electrical control means responsive to said movable member for regulating the speed of a dental engine or rendering said pressure regulator means responsive to said movable member to regulate the speed of a dental turbine.

9. Apparatus in accordance with claim 8 in which said selective control means includes a solenoid valve controlling the flow of fluid under pressure to said pressure regulator means and a switch in circuit between said valve and dental engine electrical control means for selectively opening said valve means or rendering said dental engine electrical control means effective to regulate the speed of said dental engine.

10. A dual control for controlling a dental engine and a fluid driven dental turbine comprising, in combination, an electrical control means to regulate the speed of said dental engine, a pressure regulator means for regulating the flow of fluid under pressure from a source to said turbine, and means including a manually actuated lever common to both said electrical control and pressure regulator means for selectively controlling one of said electrical control and pressure regulator means thereby to selectively regulate the speed of said engine and turbine.

References Cited by the Examiner
UNITED STATES PATENTS

| | | | |
|---|---|---|---|
| 2,133,332 | 10/38 | Pieper | 32—22 |
| 2,902,762 | 9/59 | Madsen | 32—28 |
| 2,984,008 | 5/61 | Weisberg | 32—28 |
| 3,031,760 | 5/62 | Bender | 32—33 |
| 3,039,193 | 6/62 | Williams | 32—28 |
| 3,094,780 | 6/63 | Maurer et al. | 32—28 |

RICHARD A. GAUDET, *Primary Examiner.*
ROBERT E. MORGAN, *Examiner.*